Figure 1:
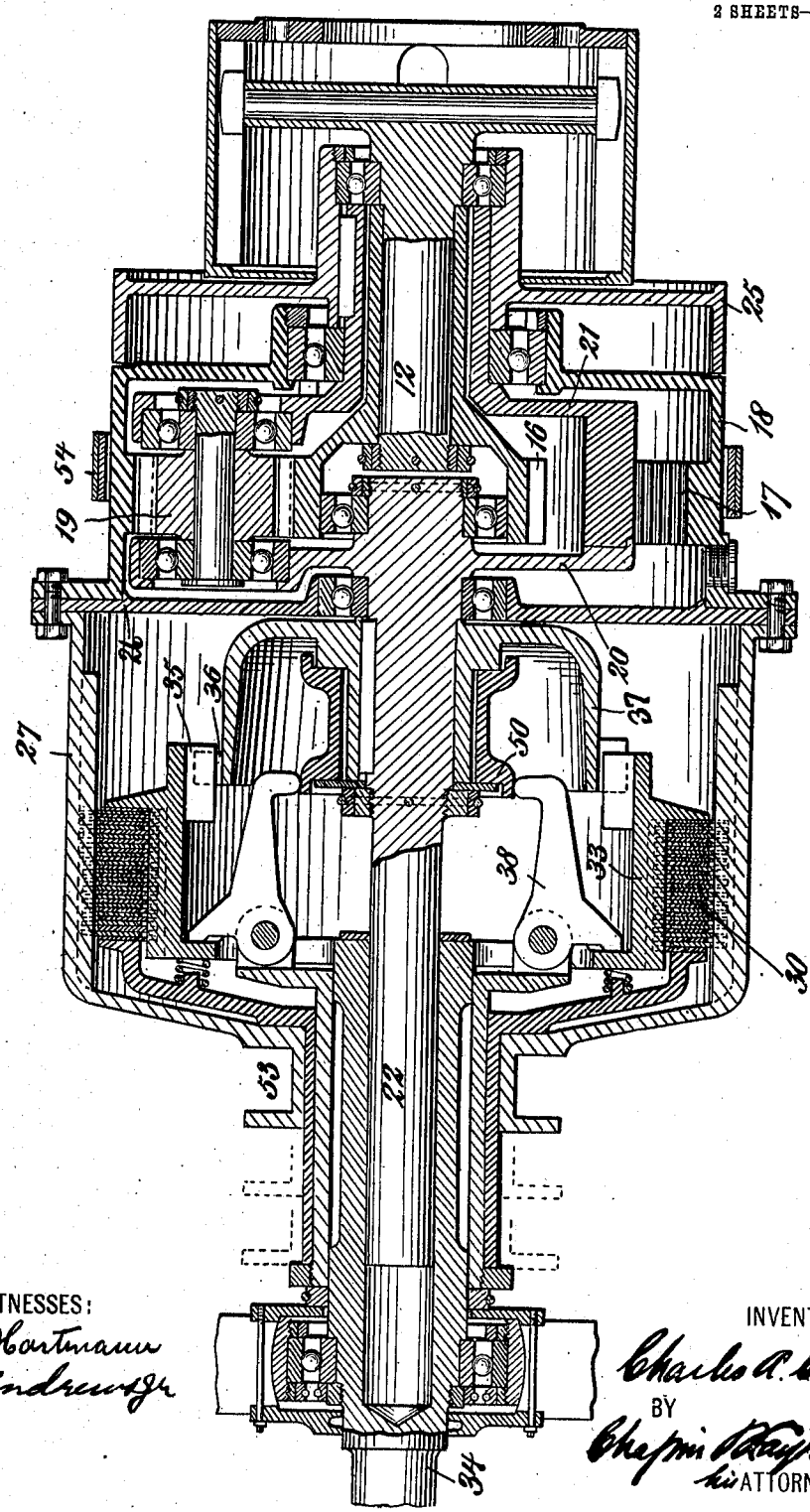

C. A. CARLSON.
TRANSMISSION GEARING.
APPLICATION FILED FEB. 2, 1910.

970,792.

Patented Sept. 20, 1910.
2 SHEETS—SHEET 1.

WITNESSES:

INVENTOR

C. A. CARLSON.
TRANSMISSION GEARING.
APPLICATION FILED FEB. 2, 1910.
970,792.
Patented Sept. 20, 1910.
2 SHEETS—SHEET 2.
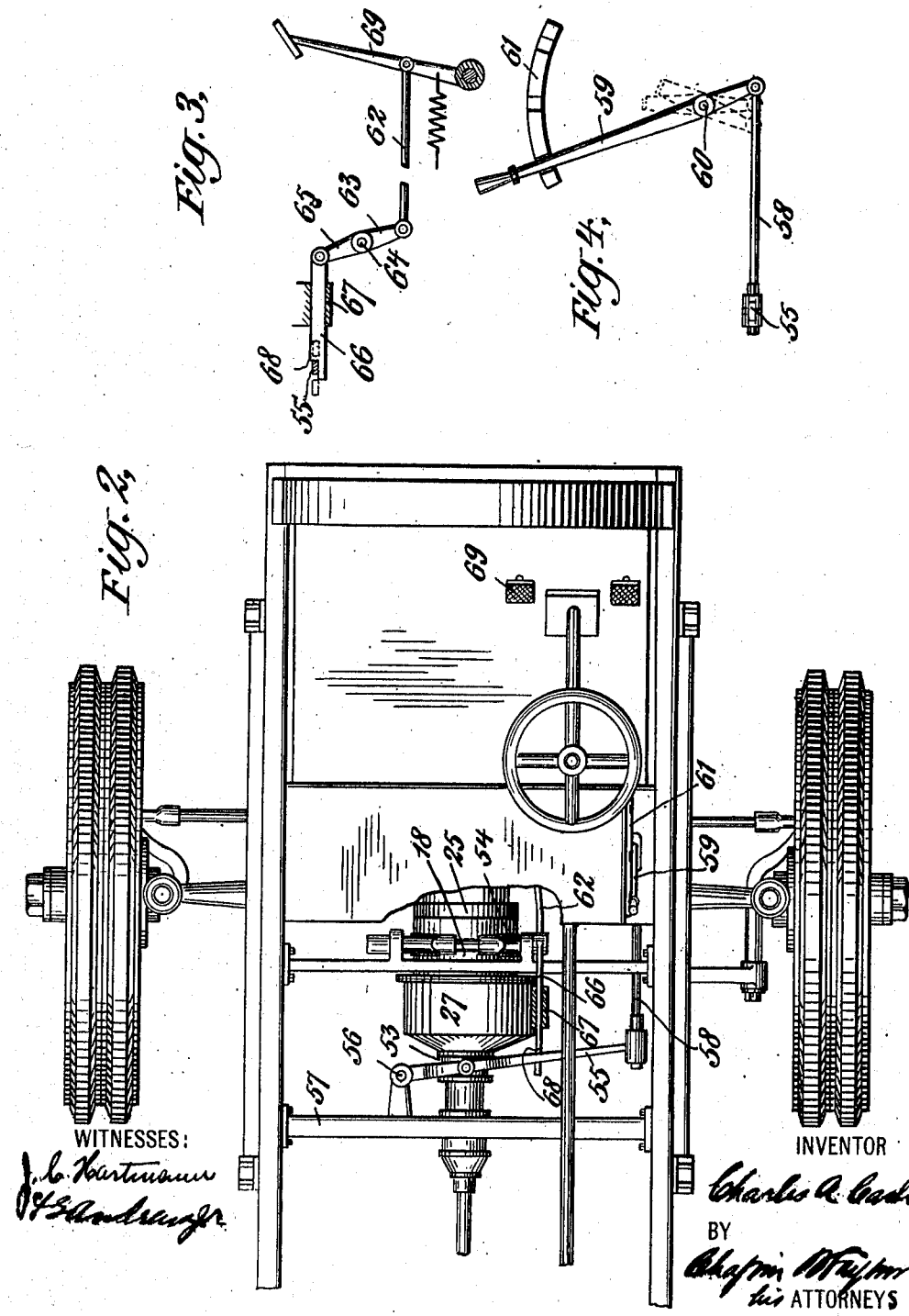

UNITED STATES PATENT OFFICE.

CHARLES A. CARLSON, OF BROOKLYN, NEW YORK, ASSIGNOR TO CARLSON MOTOR & TRUCK COMPANY, OF PHILADELPHIA, PENNSYLVANIA, A CORPORATION OF NEW YORK.

TRANSMISSION-GEARING.

970,792.     Specification of Letters Patent.     Patented Sept. 20, 1910.

Application filed February 2, 1910. Serial No. 541,412.

*To all whom it may concern:*

Be it known that I, CHARLES A. CARLSON, a citizen of the United States of America, and a resident of Brooklyn, county of Kings, and State of New York, have invented certain new and useful Improvements in Transmission-Gearing, of which the following is a specification, reference being had to the accompanying drawings, forming a part thereof.

My invention relates to transmission gearing and operating means therefor, and particularly to a type of planetary transmission gearing in which certain parts are axially shiftable for the purpose of operating clutch mechanism to bring about changes in the relationship of the elements of the mechanism, the said parts including two brake drums which, in such shifting movement, are moved to a position to be in engagement, either the one or the other, with a single brake band. This transmission gearing is particularly designed for employment in motor vehicles, though it has of course, other uses and may be employed in other connections.

My present invention consists in an interlocking means between the means for axially shifting the parts and the means for applying the brake, whereby the said parts will be locked against such shifting movement from one position to another during the time the brake is applied. Transmission gearing of this particular type is arranged for high speed forward driving,—*i. e.*, a direct connection in which the driven element is locked to the driving element and partakes of its movements,—low speed forward driving, and reverse driving. The parts are shifted to three positions to bring about the proper connections for the above driving relations, and during low speed forward and reverse driving the brake must be applied to hold one of the elements of the gearing stationary.

The object of my present invention is to prevent the parts from being shifted from low speed forward to high speed forward driving relations while the brake, which is applied during the time low speed forward driving is being accomplished, is still in operation, for as the continued application of the brake is necessary in the driving of the vehicle forward at a low speed, I find there is a tendency for the operator to throw the control lever to the high speed position before he releases the brake. The result of this is a straining of a brake or injury to other parts of the mechanism.

In order that my invention may be thoroughly understood, I will now proceed to describe an embodiment thereof, having reference to the accompanying drawings illustrating the same, and will then point out the novel features in claims.

In the drawings: Figure 1 is a view in central longitudinal section through the transmission gearing proper. Fig. 2 is a top view of the same showing it as applied to a motor vehicle, and showing also the operating means for the axially shiftable parts and for the brake. Fig. 3 is a detail view in part side elevation and part section of the brake operating means. Fig. 4 is a detail fragmentary view in side elevation of the operating means for the axially shiftable parts.

Referring to the transmission gearing itself, and particularly to Fig. 1 in which it appears in longitudinal section upon an enlarged scale, the same will be seen to comprise a driving shaft 12, an intermediate shaft 22, and a driven shaft 34,—all arranged axially in line with each other, a sun gear 16 carried by the drive shaft, a planetary gear 19 in mesh therewith and carried by an intermediate member 20—21 mounted to rotate with the intermediate shaft 22, a ring gear 17 in mesh with the planetary gear and mounted concentrically with the said sun gear and surrounding the same, and a casing including two drums 18 and 27 with a head 26 between them, the said drum 18 serving to support the ring gear and also constituting a brake drum. A similar brake drum 25 is arranged alongside the drum 18, being mounted to rotate with the said intermediate member.

A friction clutch 30 is arranged between the casing drum 27 and a member 33 mounted fast upon the driven shaft 34, and co-engaging clutch teeth 35—36 are carried respectively by the said member 33 and a member 37 secured to the intermediate shaft 22. The shaft 22 also carries a cam 50 for engagement with operating arms 38 to operate the said friction clutch 30.

The driven shaft 34, together with the friction clutch 30 and the operating arms 38, are held permanently against any substantially longitudinal or axial movement, while all the other parts so far described are mounted to move axially or longitudinally with respect thereto. When in the position shown in Fig. 1 the clutches 30 and 35—36 are both in an operative position, whereby the intermediate and ring gear members are both locked to the driven member, with the result that the entire gearing is locked up and turns as a unit with the drive shaft to effect high speed forward driving. When moved into an intermediate position,—that is half way to the left (as is shown in Fig. 2) of their full movement,—the cam 50 releases the arms 38 whereby to release the friction clutch 30,—the co-engaging teeth 35, 36 of the jaw clutch being still, however, maintained in co-engagement. In this position the intermediate member is locked to the driven shaft while the casing and ring gear carried thereby are left free from connection therewith. When the parts are moved all the way over to the left (as viewed in Fig. 1), the teeth 35—36 will be released from engagement with each other while the cam 50 will once more act upon the arms 38 to operate the friction clutch 30, whereby the casing and ring gear will be locked to the driven member, but the intermediate member will be relieved from rotative engagement therewith.

In the longitudinal or axial movement of the parts the brake drums 17 and 25 will slide laterally with respect to a brake band 54 arranged for co-engagement with either of them. When the parts are in an intermediate position the drum 18 will be beneath the brake band 54, while when the parts are in their position all the way over to the left the brake drum 24 will be beneath the brake band 54. In the intermediate position the application of the brake band will hold the ring gear member against rotation, thereby compelling the intermediate member to be carried forward with, and by reason of, the orbital movement of the planetary gear 19 around the axis of the sun gear, thus resulting in low speed forward driving movements being imparted to the shaft 34. On the other hand, in the third position, the application of the brake will hold the drum 25 stationary, thereby preventing the planetary gear wheel from having such an orbital movement, in consequence of which the movements of the sun gear will be imparted in a reverse direction to the ring gear and through the friction clutch 30 to the driven shaft.

For a complete description and detailed illustration of this gearing, I refer to the joint application above mentioned, it being noted that Fig. 1 herein is a copy of one of the figures in this application, and the reference characters employed herein are identical with those employed in the same figure in the said application. For the present purposes it is only necessary to bear in mind that in the position shown in Fig. 1 of the drawings the parts are adjusted for high speed forward driving without the brake being employed, that in an intermediate position the parts are adjusted for low speed forward driving upon proper application of the brake being made, and that when the parts are moved all the way over to the left (as viewed in Fig. 1) an application of the brake will result in driving movements being transmitted rearwardly. For shifting the parts axially the casing is provided with a collar 53 which is adapted to be engaged by a suitable shipping lever. Referring to Fig. 2 of the drawings in which the transmission gearing is shown as mounted in the framework of a motor vehicle, such a lever is shown at 55, the same being pivoted at 56 to the said framework 57. At its free end the said lever is connected by means of a link 58 with an operating lever 59 pivoted at 60 to a point stationary with the frame. A quadrant 61 is conveniently provided for maintaining the lever in any one of the three positions to which it may be adjusted.

The brake band 54 is operated by means of a pedal 69 which is connected by means of a link 62 with an operating arm 63 mounted upon a rotatable element 64, the rotation of which acts to bind the brake band upon the drum with which it is at the time in engagement. Secured to the element 64 is another arm 65, the free end of which is pivoted to a locking element 66 mounted to slide in a portion 67 of the frame. The locking element or slide 66 is provided with a shouldered portion 68 which is arranged in a line with the shipping lever 55. When the shipping lever is in an intermediate position and the brake is applied this shouldered portion 68 will just engage the said lever whereby it will be impossible to move the shipping lever farther to the right (as viewed in Fig. 2). In other words, for so long a time as the brake is applied it will not be possible to shift the lever from an intermediate position to which the parts are adjusted for low speed forward drive, to its position all the way to the right in which position the parts are adjusted for high speed forward drive. If such be attempted one of two things will result,— either the power applied to the pedal 69 will be sufficient to prevent the operator from moving the lever 59 backward from an intermediate position, or, if the operator apply enough force to move the lever 59 backward he will thereby force the slide 66 forward and release the brake.

From the foregoing it will be seen that it will be impossible for the operator to change from low speed forward to high speed drive while the brake 25 is applied, thereby obviating possible injury to the parts. It may be noted that there is nothing to prevent the shipping lever 55 being moved from its intermediate to its low speed position while the brake is applied, but this is immaterial because while an operator might readily try to shift his gearing from low speed forward to high speed forward while the brake is applied, he would never attempt to shift from low speed forward to reverse under the same conditions, because before reversing it would be necessary to bring the mechanism to a standstill even if but for a fraction of a second. To do this it is necessary to release the brake, and hence when an operator wishes to reverse the first thing he naturally does is to let go the pedal 69. Moreover, it is a fact that in almost every instance the car is brought to a stop for an appreciable length of time before the reverse is applied, and then the reverse is applied quite gently and usually only for a moment or two at a time; the reverse is usually only used when making a short turn, or when getting out of a difficult position.

What I claim is:

1. The combination with transmission gearing of the planetary type adapted to connect driving and driven elements in two different relations, and means for adjusting the parts therefor, of a brake for holding one of the parts stationary when the gearing is adjusted for one of the said relations, and means movable into position by the operation of the brake for interfering with the adjustment of the parts for the other of the said relations.

2. The combination with transmission gearing of the planetary type employing axially shiftable parts for connecting the driving and driven elements in different driving relations, the said parts including a means by which one of the transmission gearing elements may be held against rotation when the said parts are shifted to one position, of operating means for axially shifting the said parts, means for operating the said holding means when the said parts are shifted to one position, and means movable into position when the latter said means is operated for interfering with the operation of the former said operating means.

3. The combination with transmission gearing of the planetary type employing axially shiftable parts for connecting the driving and driven elements in different driving relations, the said parts including a brake drum by which one of the transmission gearing elements may be held against rotation when the said parts are shifted to one position, of operating means for axially shifting the said parts, a brake for engagement with the said drum, and means movable into position when the said brake is operated for interfering with the axial shifting of the said parts.

4. The combination with transmission gearing of the planetary type employing axially shiftable parts for connecting the driving and driven elements in high speed and low speed driving relations therethrough and having an element for coaction with a restraining device, of operating means for axially shifting the said parts, means for operating the restraining device, and means operated by the latter said means when the same is operated, for interfering with the operation of the former said means.

5. The combination with transmission gearing of the planetary type employing axially shiftable parts for connecting the driving and driven elements in different driving relations and having two elements for coaction with a single restraining device, of operating means for axially shifting the said parts, means for operating the restraining device, and interlocking means between the two said operating means, substantially as set forth.

6. The combination with transmission gearing of the planetary type employing axially shiftable parts for connecting the driving and driven elements in different driving relations, the said parts including two drums for coaction with a single restraining device, of operating means for axially shifting the said parts, means for operating the restraining device, and means movable into position by the operation of the restraining device, for interfering with the axial shifting of the said parts.

7. The combination with transmission gearing of the planetary type employing restraining means including two parts axially shiftable with respect to each other, of operating means for so shifting the parts, means for operating the restraining means, and means movable into position upon the operation of the latter said means, to interfere with the operation of the former said operating means.

8. The combination with transmission gearing of the planetary type employing an axially shiftable brake drum and a brake therefor, of operating means for axially shifting the drum, means for operating the brake, and means movable into position upon the operation of the brake, to interfere with the axial shifting of the drum.

CHAS. A. CARLSON.

Witnesses:
D. HOWARD HAYWOOD,
LYMAN S. ANDREWS, Jr.